United States Patent [19]

Sodeikat

[11] Patent Number: 4,684,804
[45] Date of Patent: * Aug. 4, 1987

[54] METHOD AND APPARATUS FOR PROCESSING THE OUTPUT SIGNALS OF AN OPTICAL EARTH-HORIZON SENSOR OPERATING IN THE INFRARED RANGE OF AN ORBITING EARTH SATELLITE

[75] Inventor: Dieter Sodeikat, Baierbrunn, Fed. Rep. of Germany

[73] Assignee: Messerschmitt-Bölkow-Blohm Gesellscaft mit beschränkter Haftung, Munich, Fed. Rep. of Germany

[*] Notice: The portion of the term of this patent subsequent to Jun. 9, 2004 has been disclaimed.

[21] Appl. No.: 745,021

[22] Filed: Jun. 13, 1985

[30] Foreign Application Priority Data

Jun. 14, 1984 [DE] Fed. Rep. of Germany ....... 3422007

[51] Int. Cl.⁴ .................................. G01J 1/34
[52] U.S. Cl. .................... 250/338; 250/342; 250/347; 250/351
[58] Field of Search ............. 250/338, 349, 347, 342, 250/352, 351; 364/434, 459

[56] References Cited

U.S. PATENT DOCUMENTS

| | | | |
|---|---|---|---|
| 3,486,024 | 12/1969 | Astheimer | 250/338 |
| 3,551,681 | 12/1970 | Astheimer | 250/349 |
| 3,714,432 | 1/1973 | Jalink, Jr. | 250/340 |
| 3,920,994 | 11/1975 | Cargille | 250/347 |

FOREIGN PATENT DOCUMENTS

3322750 1/1985 Fed. Rep. of Germany ...... 250/338

Primary Examiner—Carolyn E. Fields
Assistant Examiner—Richard Hanig
Attorney, Agent, or Firm—Toren, McGeady and Goldberg

[57] ABSTRACT

A method and an apparatus for processing the output signals of an optical earth-horizon sensor (1) operating in the infrared range of an orbiting, e.g. stationary earth satellite with respect to variously warm oppositely located earth rims (earth anomaly). With the earth-horizon sensor (1), an off-course signal is formed which is a measurement of the off-course angle of the line of sight of the earth-horizon sensor in relation to the satellite/earth central point connection line and is used for the attitude control of the earth satellite. This off-course signal is corrected in dependence on the earth anomaly. For a fine correcting of the off-course signal, the output signals of the earth horizon sensor which can be assigned to an earth rim with higher temperature, and those which can be assigned to the other oppositely located earth rim with lower temperature, are attenuated or amplified, respectively, in such a way, in dependence on a correction signal taking into account the earth anomaly, that the amplitude changes of the off-course signal caused by the earth anomaly are cancelled.

2 Claims, 2 Drawing Figures

METHOD AND APPARATUS FOR PROCESSING THE OUTPUT SIGNALS OF AN OPTICAL EARTH-HORIZON SENSOR OPERATING IN THE INFRARED RANGE OF AN ORBITING EARTH SATELLITE

BACKGROUND OF THE INVENTION

1. Field of the Invention

The invention is directed to a method and an apparatus for processing the output signals of an optical earth-horizon sensor of an orbiting earth satellite with respect to variously warm oppositely located earth rims (earth anomaly) for forming an off-course signal which is a measurement for an off-course angle of a line of sight of the earth-horizon sensor in relation to a satellite/earth central point connecting line, wherein the earth-horizon sensor includes a periodically reciprocated chopper disk located in the focal plane of an input lens, the chopper disk having a diameter corresponding to an image of the earth, and a detector collecting the periodically interrupted radiations entering said input lens, wherein the output signals of the detector are amplified and demodulated with the chopper frequency in order to form the off-course signal and corrected in the presence of an earth anomaly by means of a correction or anomaly signal.

2. Description of Related Art

For the attitude control of such, e.g. geostationary, satellites, control or off-course signals are required which report the incorrect position of the satellite with respect to a reference position. For this purpose, optical earth-horizon sensors, which can be classed with the zero-seeking sensors, are used, among others, for two satellite axes. Such an earth-horizon sensor operates in the infrared range and is based on the mechanical vibrator or chopper principle. The infrared radiation of the earth is collected by means of an objective lens, consisting of germanium, and falls on a circular vibrator or chopper disk in the focal plane of the lens. This chopper disk has a diameter corresponding to the image of the earth and is periodically reciprocated with a determined amplitude, the chopper amplitude, and a determined frequency, the chopper frequency. The light of the two oppositely located earth horizons alternatively released at the chopper frequency, which light enters through the input lens and is interrupted by the chopper disk, is directed onto a detctor, e.g. a pyroelectric detector, via a secondary lens consisting of a spherical mirror segment and a prism via a spectral filter for the infrared range.

The output signal of the detector is amplified and subsequently demodulated with the chopper frequency. If the line of sight of an earth-horizon sensor is directed exactly on the earth central point, i.e. if the satellite is located in the above-mentioned reference position, then the light energy received by the detector from the two earth-horizons is identical. In this case, the earth-horizon sensor supplies a zero signal by means of the demodulation of the output signal. However, if the line of sight of the earth-horizon sensor diverges from the satellite/earth central point connecting line, i.e. if the satellite is located in an incorrect position, then the detector receives different light energies from the two earth rims, the difference being a measurement of the off-course angle of the line of sight of the earth-horizon sensor in relation to the satellite/earth central point connecting line, i.e. it is a measurement for the incorrect position of the satellite.

In the previously described processing of the detector output signals, it is assumed that the two oppositely located earth rims have the same temperature, so that identical energy quantities are received by the detector in the reference position of the satellite and a zero signal is accordingly reported. However, this is a theoretical ideal case. Normally, the oppositely located earth horizons under consideration have different temperatures, which is commonly designated as an earth anomaly. In this case, the earth-horizon sensor would also report an ostensible off-course signal in the reference position of the satellite, which off-course signal is based solely on this earth anomaly. This ostensible off-course signal is, accordingly, in fact a zero point error of the earth-horizon sensor due to different radiations of the oppositely located earth horizons. This anomaly error is only slight, but in extreme cases can amount to approximately $+20\%$ of an angular degree corresponding to the measuring range of the earth-horizon sensor. Since geostationary satellites are used, among other things, for producing directional radio links and guided television links to the earth, this anomaly error must be corrected. A possibility for such an anomaly correction is described in the applicant's copending application Ser. No. 745,020.

It can be shown that the anomaly portion of the off-course signal depends only on the earth anomaly and the chopper amplitude and—at least in small off-course angles —is even independent of the off-course signal. According to the above-mentioned suggestion, the earth-horizon sensor is operated with different chopper amplitudes on the basis of this knowledge. This can be effected, for example, intermittently or with the aid of a modulation of the chopper amplitude. The use of two earth-horizon sensors which are operated with different amplitudes is also possible. The respective off-course signals of the earth-horizon sensor are compared with values of the standard characteristic lines for chopper amplitudes without earth anomaly in a common off-course angle. If the measured values cannot be assigned to a common off-course angle then an earth anomaly is present, since the measured values and the value on the standard characteristic line could otherwise be made to overlap. The characteristic lines assigned to the measured values are subsequently displaced in such a way that these characteristic lines can be made to overlap with the standard characteristic line. The magnitude of this displacement corresponds to the anomaly error and is a direct measurement for the earth anomaly.

The anomaly correction noted above is based on the following principles. If there is no earth anomaly, the characteristic line of the earth-horizon sensor can be approximately shown by means of the following formula:

$$U_{D\alpha} = \frac{2}{\pi} \cdot K \cdot A \cdot \text{sine}\left(\alpha \cdot \frac{K_A}{A} \cdot 90\right) \tag{1}$$

The formula is applicable for the range $$-1 \leq \alpha \cdot \frac{K_A}{A} \leq +1$$

In the formula:

$U_{D\alpha}$ = the sensor off-course signal which is dependent on the the off-course angle $\alpha$ and is measured as electrical current;

K = a constant proportionality factor which is determined by means of the sensor geometry;

A = chopper amplitude;

$\alpha$ = off-course angle of the line of sight of the earth-horizon sensor;

$K_A$ = a mechanical, likewise constant transmission factor.

The entire characteristic line extends over an angle area of approximately ±18°; the measuring range used for the sensor off-course angle is approximately ±1°. It can be seen that the characteristic line can be linearized for small off-course angles, specifically by means of the following formula:

$$U_{D\alpha}{}^x = K \cdot K_A \cdot \alpha \qquad (2)$$

If the two earth rims radiate different energies then the entire characteristic line $U_D$ is composed of the above uninterrupted characteristic line $U_{D\alpha}$ and an anomaly portion $U_{DA}$:

$$U_D = U_{DA} + U_{D\alpha} \qquad (3)$$

The anomaly portion $U_{DA}$ is then $$U_{DA} = K \cdot A \cdot \frac{1-V}{1+V} \qquad (4)$$

On the basis of the above formula 1, 3 and 4, then, there follows for the characteristic line $U_D$ of the earth-horizon sensor $$U_D = K \cdot A \cdot \frac{1-V}{1+V} + \frac{2}{\pi} \cdot K \cdot A \cdot \text{sine}\left(\alpha \frac{K_A}{A} \cdot 90\right) \qquad (5)$$

$$\text{for } -1 \leq \alpha \frac{K_A}{A} \leq +1$$

or for small values $\alpha$ $$U_D{}^x = K \cdot A \cdot \frac{1-V}{1+V} + K \cdot K_A \cdot \alpha \qquad (6)$$

It follows from formula 4 to 6 that, as indicated above, the anomaly portion of the sensor off-course signal depends only on the anomaly V and the chopper amplitude A.

If the sensor off-course signal is now measured at two different chopper amplitudes A and A1, the anomaly portion $U_{DA}$ will be independent of the anomaly V at least for small angles. For small angles $$U_{DA} = \frac{A}{A - A_1} (U_D - U_{D1}) \qquad (7)$$

applies for the anomaly portion and $$U_{D\alpha}{}^x = U_D - \frac{A}{A - A_1} (U_D - U_{D1}) \qquad (8)$$

applies for the characteristic line $U_{D\alpha}{}^x$ which is simplified, corrected and true for small off-course angles $\alpha$.

For the earth anomaly V there follows $$V = \frac{(A - A_1) \cdot K - (U_D - U_{D1})}{(A - A_1) \cdot K + (U_D - U_{D1})} \qquad (9)$$

from which it follows that the earth anomaly depends only on the chopper amplitude and the sensor off-course signals at the different chopper amplitudes. Of course, for large off-course angles, the complete formula for the characteristic line must be made use of.

In this anomaly correction, the output signals of the detector are corrected with their noise portions affected by the amplification and signal processing.

SUMMARY OF THE INVENTION

The invention has the object of providing a method and an apparatus with which the earth anomaly can be more finely corrected and can be suppressed for the attitude control.

The object is met, according to the invention, for a method and an apparatus as set forth in the opening paragraph, characterized in that the output signals of the detector assigned to an earth rim with a higher temperature and the output signals of the detector assigned to the other earth rim with a lower temperature are attenuated or amplified in dependence on the anomaly signal by the same factor in each instance in such a way that the amplitude changes caused by said earth anomaly are cancelled.

Accordingly, the amplitudes of the output signals of the detector which are assigned to the two oppositely located earth rims, are evaluated in dependence on the anomaly signal. The output signal assigned to the earth rim with the higher energy radiation or temperature is attenuated by the same factor as that by which the output signal assigned to the oppositely located earth rim with the lower energy radiation or temperature is amplified. The inhomogeneous characteristic of the earth radiation can be eliminated in the measuring direction by means of this. Moreover, the earth anomaly is suppressed up to the value of the residual noise of the entire evaluating circuit for the earth-horizon sensor.

DESCRIPTION OF THE DRAWINGS

The invention is explained in more detail in an embodiment example by means of the accompanying drawings in which.

DESCRIPTION OF THE PREFERRED EMBODIMENT

Figure 1:
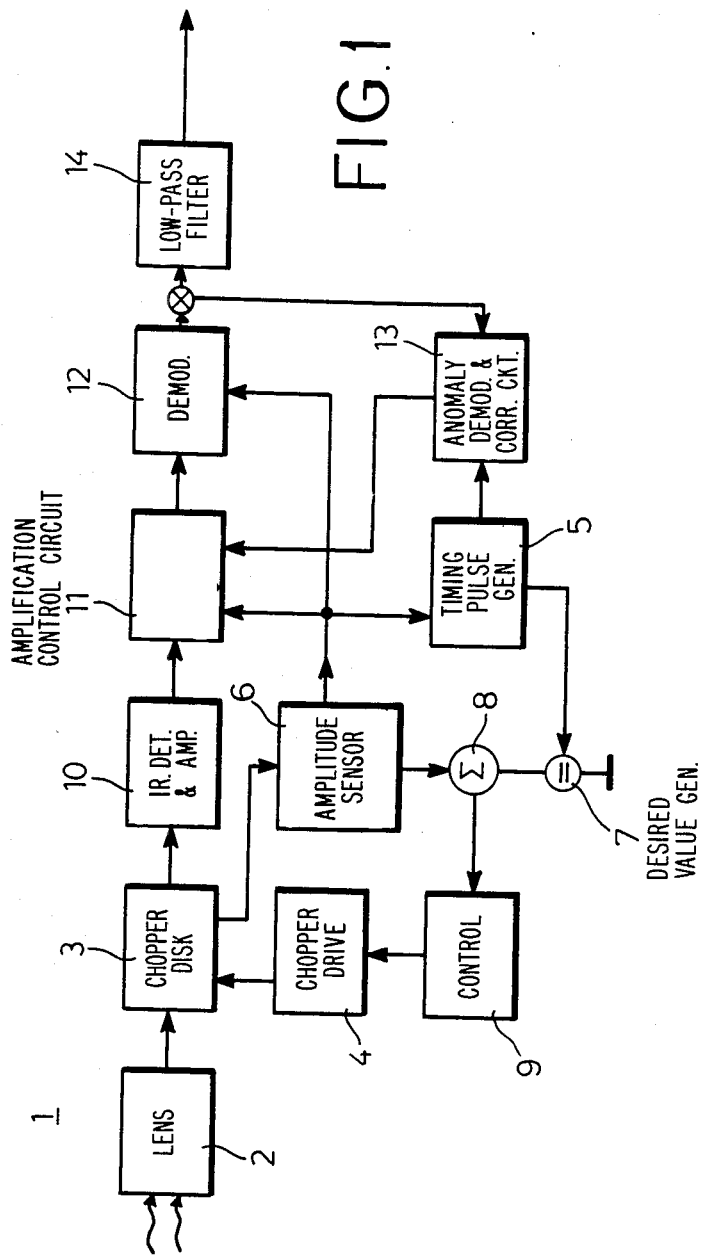
FIG. 1 shows a schematic block diagram of an earth-horizon sensor with anomaly correction according to the invention; and, FIG. 2 shows a functional block diagram of the optical system of the earth-horizon sensor.
Figure 2:
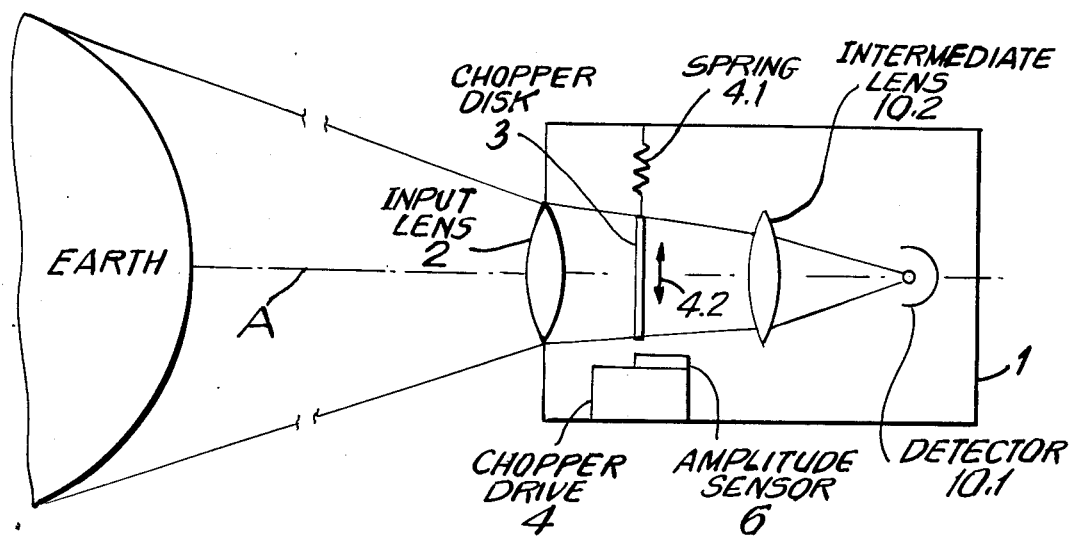

As shown in FIGS. 1 and 2, an optical zero-seeking earth-horizon sensor 1 comprises an input lens 2 which is sensitive to light in the infrared area. Arranged in the focal plane of the lens 2 is a vibrator or chopper disk 3 which is driven by means of a drive 4, e.g. a resonant magnet-spring (4.1) system. The chopper disk is driven in a controlled manner with a constant frequency of, e.g. 40 Hz, in the direction of two-ended arrow 4.2 with a determined chopper amplitude. The chopper amplitude is continuously modulated between two values by means of a timing pulse generator 5 periodically between a lower and an upper amplitude value. The timing pulse generator 5 receives signals from a sensor 6 which measures the respective chopper amplitude. The output signal of the timing pulse generator 5 is fed to a desired value generator 7. The desired value of the chopper amplitude is compared in a summing circuit 8 with the actual value supplied by means of the sensor 6; the difference is fed as a control means signal to a control means 9 which controls the drive 4 of the chopper disk 3.

The infrared radiation which is periodically let through by the chopper disk 3 falls on an infrared detector 10.1 via intermediate lens 10.2, whose output signal is amplified. The infrared detector and amplifier are shown in FIG. 1 by means of block 10. The amplifier for the infrared detector is an amplifier with variable gain and accordingly comprises an amplification control means 11 which is keyed with the chopper frequency. The keying frequency is supplied by means of the sensor 6 for the chopper amplitude. The output signal of the amplification control means 11 is fed to a demodulator 12 which is controlled, in turn, via the chopper frequency supplied by the sensor 6. The output of this demodulator 12 is fed to an anomaly demodulator 13 which is, in turn, controlled by the timing pulse generator 5.

In the modulation of the chopper amplitude described above, a signal appears at the output of the demodulator 12 which comprises a likewise modulated anomaly portion. This anomaly portion is demodulated in the anomaly demodulator 13. The anomaly-dependent portion and the anomaly itself are determined with respect to magnitude and direction from this demodulated signal internally in the demodulator in a correction and linearization circuit, as described above in the section entitled Background of the Invention. This anomaly signal is fed to the control means input of the keyed amplification control means 11 and determines the factor by which the output signal of the detector 10 for the warmer earth rim is attenuated and by which the output signal for the oppositely located cooler earth rim is amplified to the extent that an earth anomaly is present. The amplitudes of the two respective output signals for the oppositely located earth rims are accordingly evaluated. In case the earth satellite is located in the reference position and earth anomaly is present, the output signals of the detector 10 for both earth rims are processed with the same level by means of this step of the amplification control means 11, despite different temperatures. If the satellite is in an incorrect position the inhomogeneous characteristic of the earth radiation at the two oppositely located earth rims is eliminated. The off-course signals, corresponding to an incorrect position of the satellite, are determined independently of the anomaly portion in this manner. The portion of the off-course signal directed to the earth anomaly can in this way be suppressed up to the value of the residual noise of the entire evaluating circuit.

In order to suppress high frequency disturbing portions, the output signal of the off-course demodulator 12 is fed to a low-pass filter 14 which provides the off-course signal used for the control with controlled earth anomaly.

The indicated method for the fine correction of the anomaly correction is independent from the correction method applied, e.g. from the above correction method by means of amplitude modulation.

I claim:

1. Method for processing the output signals of an optical earth-horizon sensor operating in the infrared range of an orbiting earth satellite with respect to variously warm oppositely located earth rims (earth anomaly) for forming an off-course signal which is a measurement of the off-course angle of a line of sight of said earth horizon sensor in relation to a satellite/earth central point connecting line, wherein said earth-horizon sensor comprises a periodically reciprocated chopper disk located in the focal plane of an input lens, said chopper disk having a diameter corresponding to the image of the earth, and a detector collecting the periodically interrupted radiation falling in said input lens, wherein the output signals of said detector are amplified and demodulated with the chopper frequency in order to form said off-course signal, characterized in that in order to reduce error of said sensor off-course signals produced by differently warm earth rims (anomaly), said method comprises operating said earth-horizon sensor with different chopper amplitudes, comparing the respective off-course signals for the chopper amplitudes with the values of the standard sensor off-course signals for chopper amplitudes without said anomaly in a common off-course angle, when the corresponding values for a common off-course angle do not coincide, determining the difference between the measured values and said standard off-course signal values, and selectively amplifying or attenuating said detector output signals, in dependence on said difference, by the same factor in each instance in such a way that the amplitude changes caused by said earth anomaly are cancelled.

2. Apparatus for processing the output signals of an optical earth-horizon sensor operating in the infrared range of a geostationary earth satellite with respect to variously warm oppositely located earth rims (earth anomaly) for forming an off-course signal which is a measurement of the off-course angle of a line of sight of said earth-horizon sensor in relation to a satellite/earth central point connecting line, including at least one earth-horizon sensor having a chopper disk located in the focal plane of an input lens, a chopper drive for periodically reciprocating said chopper disk at different amplitudes, an infrared detector for detecting radiation from said oppositely located earth rims periodically admitted by said chopper disk, an amplifier coupled to said detector, and an evaluating circuit coupled to said amplifier for forming said off-course signal, as well as a correction circuit for deriving an anomaly signal corresponding to the different temperatures of said oppositely located earth rims, characterized in that said amplifier for said output signals of said detector comprises an amplification control means having a control input connected with said correction circuit, said amplification control means adjusting the amplification of the signal portions for the oppositely located earth rims in dependence on said anomaly signal in such a way that the amplitude changes of the signals for oppositely located earth rims caused by said earth anomaly are cancelled.

* * * * *